(12) United States Patent
Neuber, Jr.

(10) Patent No.: US 6,283,420 B1
(45) Date of Patent: Sep. 4, 2001

(54) FINE POSITION ADJUSTMENT FOR OPTICAL RECEIVER OR OTHER SENSOR

(75) Inventor: Joseph F. Neuber, Jr., Kimberton, PA (US)

(73) Assignee: Neuber Concrete, division of J. K. Neuber, Jr., General Contractor, Inc., Kimberton, PA (US)

( * ) Notice: Subject to any disclaimer, the term of this patent is extended or adjusted under 35 U.S.C. 154(b) by 0 days.

(21) Appl. No.: 09/484,651

(22) Filed: Jan. 18, 2000

Related U.S. Application Data
(60) Provisional application No. 60/116,419, filed on Jan. 19, 1999.

(51) Int. Cl.⁷ ....................................................... A47F 5/00
(52) U.S. Cl. .................................... 248/125.2; 248/406.1; 248/423
(58) Field of Search .............................. 248/125.1, 125.2, 248/125.3, 406.1, 405, 407, 413, 423, 157

(56) References Cited

U.S. PATENT DOCUMENTS

| | | | |
|---|---|---|---|
| 2,531,925 | * | 11/1950 | Taylor et al. . |
| 4,030,691 | * | 6/1977 | Fleshman . |
| 5,556,226 | * | 9/1996 | Hohmann, Jr. . |
| 5,648,846 | * | 7/1997 | Douine et al. . |

\* cited by examiner

Primary Examiner—Anita King
Assistant Examiner—Korie H. Chan
(74) Attorney, Agent, or Firm—Peter J. Van Bergen

(57) ABSTRACT

An adjustable support for a sensor has a first support defining a first end and a second end. A first clamp is fixedly coupled to the first support between the first and second and thereof. The first clamp has an adjustable coupling for selective fixation to a support platform. A second support is adjustably coupled to the first support in a way that supports the second support, facilitates selective movement of the second support relative to the first support in one dimension, and facilitates fixation of the second support relative to the first support. A second clamp is adjustably coupled to the second support so that a sensor fixedly coupled to the second clamp can be moved relative to the second support and fixed thereto by the second clamp.

19 Claims, 1 Drawing Sheet

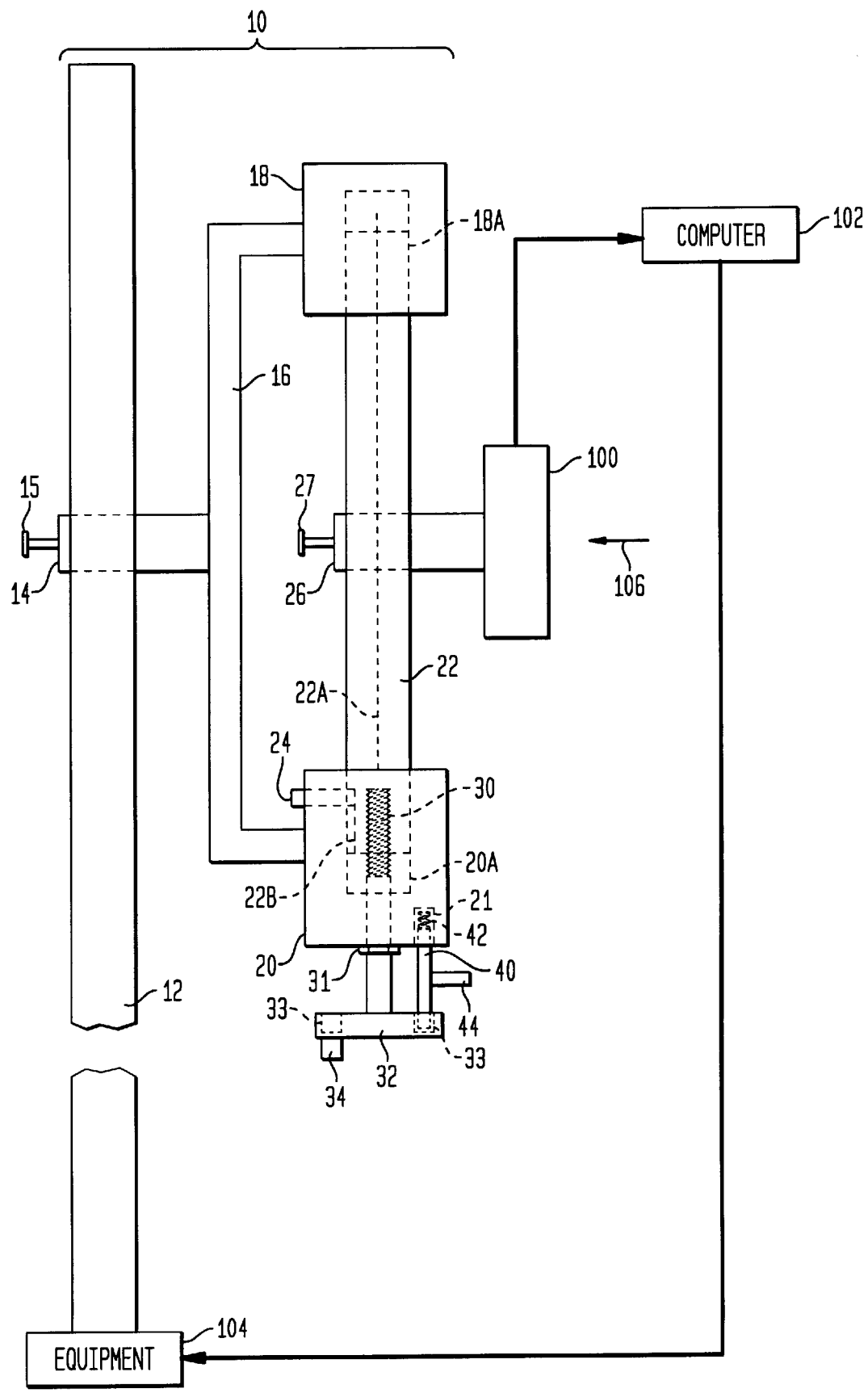

FINE POSITION ADJUSTMENT FOR OPTICAL RECEIVER OR OTHER SENSOR

CLAIM OF BENEFIT OF PROVISIONAL APPLICATION

Pursuant to 35 U.S.C. Section 119, the benefit of priority from provisional application 60/116,419, with a filing date of Jan. 19, 1999, is claimed for this non-provisional application

FIELD OF THE INVENTION

The invention relates generally to mechanical positioning devices, and more particularly to a device capable of providing a fine (vertical) position adjustment for an optical receiver used to detect a laser beam in, for example, a laser grading system, laser screed, or any other laser guided piece of equipment.

BACKGROUND OF THE INVENTION

The operating height of surface finishing equipment such as graders or screeds is increasingly being controlled by lasers or other optical systems. Typically, a remotely-located optical transmitter such as a laser focuses a beam of optical energy towards an optical receiver mounted atop a piece of finishing equipment. The optical receiver is usually clamped to a support pole extending from the finishing equipment. During set-up, the optical receiver is moved (e.g., raised or lowered) for optimum signal reception. To do this, an operator un-clamps the optical receiver from its support pole, slides the clamp on the support pole, re-clamps the optical receiver at a new position on the support pole, and tests the optical system to see if such re-positioning achieves optimum signal reception. However, this trial-and-error method is time consuming. It is also difficult for the operator to achieve fine position adjustments in this manner. Further, continuous handling of the (delicate) optical receiver increases the risk of damage thereto.

SUMMARY OF THE INVENTION

Accordingly, it is an object of the present invention to provide a fine position adjustment mechanism for an optical receiver or other sensor.

Another object of the present invention is to provide a fine position adjustment mechanism for an optical receiver or other sensor that minimizes handling of the receiver or sensor.

In accordance with the present invention, an adjustable support for a sensor has a first support defining a first end and a second end. A first clamp is fixedly coupled to the first support between the first and second end thereof. The first clamp has an adjustable coupling for selective fixation to a support platform. A second support is adjustably coupled to the first support. Specifically, means are fixedly coupled to the first and second end of the first support to support the second support therebetween, facilitating selective movement of the second support relative to the first support in one dimension, and facilitating fixation of the second support relative to the first support after the selective movement. A second clamp is adjustably coupled to the second support so that a sensor fixedly coupled to the second clamp can be moved relative to the second support and fixed thereto by the second clamp.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein:

The sole FIGURE is a side view of the fine position adjustment device of the present invention as it is used with an optical receiver.

DETAILED DESCRIPTION OF THE INVENTION

Referring now to the sole FIGURE, a fine position adjustment device for an optical receiver or other sensor is shown and referenced generally by the numeral 10. Device 10 will be explained by way of example for its use in adjusting the vertical position of an optical receiver 100 clamped or otherwise attached to device 10. However, it is to be understood that other orientations of device 10 are possible to allow the position of optical receiver 100 to be adjusted horizontally, or horizontally and vertically. Optical receiver 100 is representative of any conventional optical receiver or other sensor, the choice of which is not a limitation of the present invention. In terms of the illustrative example, optical receiver 100 transmits its output to a computer 102. A piece of equipment 104 (e.g., grading equipment, laser screed, etc.) that is height-sensitive in operation is controlled by computer 102. Briefly, optical receiver 100 receives an optical signal (e.g., a laser beam 106 indicative of an operating height for equipment 104) from some remote location. Accordingly, optical receiver 100 must be properly positioned by device 10 to receive laser beam 106.

Device 10 includes a main support 12 extending up from equipment 104. Main support 12 is typically a rigid pole which can be provided as part of the present invention or which may already be an existing component of equipment 104. A first clamp 14 having a set screw or spring-loaded clamping pin 15 is provided to clamp onto main support 12. When screw or pin 15 is loosened or unlocked from main support 12, clamp 14 can be moved up or down on main support 12 to provide the macro height adjustment for optical receiver 100. Fixedly attached to clamp 14 is a bracket 16 extending above and below clamp 14. Bracket 16 is typically made from a rigid material. Depending from an upper end of bracket 16 is a first sleeve bracket 18. Fixedly depending from the lower end of bracket 16 is a second sleeve bracket 20. Extending into and between first sleeve bracket 18 and second sleeve bracket 20 is a secondary support 22 which is typically a rigid rod or post. Sleeve brackets 18 and 20 are configured to slidingly engage secondary support 22 such that secondary support 22 can move axially in one dimension, i.e., vertically in the illustrated embodiment. Accordingly, each of sleeve brackets 18 and 20 are configured with internal sleeves 18A and 20A, respectively, that allow for axial travel of secondary support 22 as will be explained further below.

Secondary support 22 must be constrained from rotational movement about its longitudinal axis 22A. This could be accomplished in a variety of ways. For example, the portion of secondary support 22 fitted in second sleeve 20A could be slotted in an axial direction along its outer perimeter as indicated by dashed line 22B. A set screw or pin 24 passing through second sleeve bracket 20 engages slot 22B thereby preventing any rotational movement of secondary support 22 while allowing axial movement. Another way to prevent such rotational movement is to key secondary support 22 with one or both of sleeves 18A and 20A.

Clamped or otherwise attached to secondary support 22 is optical receiver 100. By way of example, optical receiver 100 is clamped to secondary support 22 by means of a second clamp 26 having a set screw or spring-loaded clamping pin 27. Clamp 26 is coupled to optical receiver 100 in any suitable fashion, the choice of which is not a limitation of the present invention. Using clamp 26, optical receiver 100 will typically be attached to secondary support 22 at a central portion thereof in order to allow secondary support 22 to experience all possible axial travel in sleeves 18A and 20A.

An adjustment screw 30 is threaded into one end (e.g., lower as shown) of secondary support 22. More specifically, screw 30 passes freely through second sleeve bracket 20 and is threaded into secondary support 22. Secondary support 22 can be solid stock with threads cut therein or could have a threaded insert (not shown) fixed therein. Screw 30 can be rotated about its axis but is constrained from axial (i.e., vertical) movement. One way of doing this is illustrated in the figure. Specifically, an annular groove (not shown) is provided in screw 30 just outside of second sleeve bracket 20. A snap ring 31 is snapped into the annular groove and serves as a flange abutting second sleeve bracket 20. Of course, snap ring 31 could also be formed as an integral annular flange of screw 30.

Outside of second sleeve bracket 20, a handle 32 is fixedly coupled to screw 30 to serve as a means for drawing screw 30 further into or further out of secondary support 22. Since secondary support 22 is constrained from any axial rotation while screw 30 is constrained from axial movement, rotation of screw 30 results in axial movement of secondary support 22. Handle 32 can be provided with an indexing mark or protrusion 34 (as shown) so that one full rotation of handle 32 can be calibrated to the corresponding axial movement caused by such rotation.

Once the vertical position adjustment of optical receiver 100 is made via axial movement of secondary support 22, it may be desirable to lock or prevent further rotation of screw 30. By way of example, one way of preventing such unwanted rotation is illustrated. However, it is to be understood that other locking or rotation-prevention mechanisms could be used. In the FIGURE, second sleeve bracket 20 has a hole 21 and handle 32 has one or more holes 33. When hole 21 is axially aligned with one of holes 33, a pin 40 can extend between and partially into holes 21 and 33. Holes 21 and 33 are sized to allow for axial movement of pin 40. A spring 42 is mounted in hole 21 and is biased to drive pin 40 axially towards handle 32 so that pin 40 normally rests in an aligned one of holes 33 (as shown) thereby locking handle 32 to second sleeve bracket 20. When it is necessary to finely adjust the vertical position of optical receiver 100, pin 40 is moved axially against the bias of spring 42 until pin 40 disengages from hole 33 thereby permitting rotation of handle 32. To facilitate movement of pin 40 against the bias of spring 42, a thumb lever 44 can be provided on pin 40.

The advantages of the present invention are numerous. An optical receiver or sensor can be positioned easily for both macro and fine adjustments. Once the receiver/sensor is mounted, no further operator handling thereof is required. Fine adjustment positions can be selected and locked in using one hand. Thus, the present invention will be of great utility in the surface finishing industry where fine adjustments of optical receiving systems have previously proven to be difficult and time-consuming.

Although the invention has been described relative to a specific embodiment thereof, there are numerous variations and modifications that will be readily apparent to those skilled in the art in light of the above teachings. For example, although adjacent parallel portions of bracket 16 and secondary support 22 are vertically oriented, device 10 could be oriented such that: axial movement of secondary support 22 was parallel to the floor or at some angle thereto other than 90°. It is therefore to be understood that the invention may be practiced other than as specifically described.

What is claimed as new and desired to be secured by letters patent of the United States is:

1. An adjustable support for a sensor, comprising:
   a first support;
   a second support having a first end and a second end;
   a first clamp fixedly coupled to said second support between said first end and said second end, said first clamp further being adjustably coupled to said first support, wherein said second support can be moved relative to said first support to a selected position and fixed at said selected position by said first clamp;
   a third support;
   means for adjustably coupling said third support to said second support, said means fixedly coupled to said first end and said second end of said second support to support said third support therebetween, said means facilitating selective movement of said third support relative to said second support in one dimension and facilitating fixation of said third support relative to said second support after said selective movement; and
   a second clamp adjustably coupled to said third support, wherein the sensor fixedly coupled to said second clamp can be moved relative to said third support and fixed thereto by said second clamp.

2. An adjustable support as in claim 1 wherein each of said first support, said second support and said third support is a rigid support.

3. An adjustable support as in claim 1 wherein portions of said first support, said second support and said third support are parallel to one another.

4. An adjustable support as in claim 3 wherein said portions are oriented vertically.

5. An adjustable support as in claim 1 wherein said means includes:
   a first sleeve fixedly coupled to said first end of said second support for slidingly receiving one end of said third support; and
   a second sleeve fixedly coupled to said second end of said second support for slidingly receiving another end of said third support.

6. An adjustable support as in claim 5 wherein said means further includes:
   an adjustment screw aligned in said one dimension, passing freely through said second sleeve, and threadably coupled to said third support; and
   an axial restraint coupled to said adjustment screw for restraining movement of said adjustment screw in said one dimension upon rotational movement of said adjustment screw, wherein said rotational movement causes movement of said third support in said one dimension.

7. An adjustable support as in claim 6 wherein said means further includes a lock selectively coupling said adjustment screw to said second sleeve wherein said rotational movement of said adjustment screw can be prevented.

8. An adjustable support for a sensor, comprising:
   a first support having a first end and a second end;
   a first clamp fixedly coupled to said first support between said first end and said second end, said first clamp having an adjustable coupling for selective fixation to a support platform;

a second support;

means for adjustably coupling said second support to said first support, said means fixedly coupled to said first end and said second end of said first support to support said second support therebetween, said means facilitating selective movement of said second support relative to said first support in one dimension and facilitating fixation of said second support relative to said first support after said selective movement, wherein said means includes a first sleeve fixedly coupled to said first end of said first support for slidingly receiving one end of said second support and a second sleeve fixedly coupled to said second end of said first support for slidingly receiving another end of said second support; and a second clamp adjustably coupled to said second support, wherein the sensor fixedly coupled to said second clamp can be moved relative to said second support and fixed thereto by said second clamp.

9. An adjustable support as in claim 8 wherein each of said first support and said second support is a rigid support.

10. An adjustable support as in claim 8 wherein portions of said first support and said second support are parallel to one another.

11. An adjustable support as in claim 10 wherein said portions are oriented vertically.

12. An adjustable support as in claim 8 wherein said means further includes:

an adjustment screw aligned in said one dimension, passing freely through said second sleeve, and threadably coupled to said second support; and an axial restraint coupled to said adjustment screw for restraining movement of said adjustment screw in said one dimension upon rotational movement of said adjustment screw, wherein said rotational movement causes movement of said second support in said one dimension.

13. An adjustable support as in claim 12 wherein said means further includes a lock selectively coupling said adjustment screw to said second sleeve wherein said rotational movement of said adjustment screw can be prevented.

14. An adjustable support for a sensor, comprising:

a support bracket having a first end and a second end;

a first sleeve fixedly coupled to said first end of said support bracket;

a second sleeve fixedly coupled to said second end of said support bracket, wherein said first sleeve and said second sleeve are coaxially aligned;

a first clamp fixedly coupled to said support bracket between said first end and said second end, said first clamp having an adjustable coupling for selective fixation to a support platform;

a support post slidingly fitted in each of said first sleeve and said second sleeve and restricted to axial movement therebetween;

an adjustment screw passing freely through said second sleeve and threadably coupled to said support post in coaxial alignment therewith;

an axial restraint coupled to said adjustment screw for restraining axial movement of said adjustment screw upon rotational movement of said adjustment screw, wherein said rotational movement causes axial movement of said support post; and a second clamp adjustably coupled to said support post, wherein the sensor fixedly coupled to said second clamp can be moved relative to said support post and fixed thereto by said second clamp.

15. An adjustable support as in claim 14 wherein each of said support bracket and said support post is rigid.

16. An adjustable support as in claim 14 wherein portions of said support bracket and said support post are parallel to one another.

17. An adjustable support as in claim 16 wherein said portions are oriented vertically.

18. An adjustable support as in claim 14 further comprising a lock selectively coupling said adjustment screw to said second sleeve wherein said rotational movement of said adjustment screw can be prevented.

19. An adjustable support as in claim 18 wherein said adjustment screw includes a handle to facilitate rotation of said adjustment screw, said handle opposing said second sleeve, and wherein said lock comprises:

a spring-loaded pin mounted in and extending from said second sleeve, said spring-loaded pin being biased towards said handle; and at least one recess formed in said handle and opposing said second sleeve, wherein said spring-loaded pin is biased into one recess of said at least one recess when said recess is coaxially aligned with said spring-loaded pin.

* * * * *